United States Patent
Jedamzik

(10) Patent No.: US 10,202,304 B2
(45) Date of Patent: Feb. 12, 2019

(54) COMPONENT FOR LOW-TEMPERATURE APPLICATIONS

(71) Applicant: SCHOTT AG, Mainz (DE)

(72) Inventor: Ralf Jedamzik, Griesheim (DE)

(73) Assignee: SCHOTT AG, Mainz (DE)

( * ) Notice: Subject to any disclaimer, the term of this patent is extended or adjusted under 35 U.S.C. 154(b) by 456 days.

(21) Appl. No.: 14/564,290

(22) Filed: Dec. 9, 2014

(65) Prior Publication Data

US 2015/0158759 A1 Jun. 11, 2015

(30) Foreign Application Priority Data

Dec. 9, 2013 (DE) .......... 10 2013 225 281
Jun. 24, 2014 (DE) .......... 10 2014 212 062

(51) Int. Cl.
*C03C 10/00* (2006.01)
*C03C 3/097* (2006.01)
*C08K 13/04* (2006.01)
*C03B 32/02* (2006.01)

(52) U.S. Cl.
CPC .......... *C03C 10/0027* (2013.01); *C03B 32/02* (2013.01); *C03C 3/097* (2013.01); *C08K 13/04* (2013.01); *C03C 2204/00* (2013.01); *Y10T 428/24479* (2015.01)

(58) Field of Classification Search
CPC ............. C03C 10/0027; C03C 2204/00; Y10T 428/31; Y10T 428/24479
USPC .............. 428/688, 912.2, 426, 702; 501/4, 7
See application file for complete search history.

(56) References Cited

U.S. PATENT DOCUMENTS

| | | | |
|---|---|---|---|
| 3,642,504 A | 2/1972 | Petzold et al. | |
| 4,851,372 A | 7/1989 | Lindig et al. | |
| 5,591,682 A | 1/1997 | Goto | |
| 7,678,720 B2 * | 3/2010 | Nakajima | C03C 3/097 501/4 |
| 2012/0182636 A1 * | 7/2012 | Seibert | G02B 7/183 359/869 |
| 2013/0063833 A1 * | 3/2013 | Lemmen | G02B 7/1815 359/845 |
| 2013/0164509 A1 * | 6/2013 | Siebers | C03C 10/0027 428/210 |

FOREIGN PATENT DOCUMENTS

| | | |
|---|---|---|
| DE | 1902432 U | 10/1964 |
| DE | 1596860 A1 | 9/1970 |
| EP | 1321440 A2 | 6/2003 |
| JP | 2004131371 | 4/2004 |
| JP | 2004131372 | 4/2004 |

OTHER PUBLICATIONS

German Office Action dated Aug. 5, 2014 for corresponding German Patent Application No. 10 2013 225 281.1, 6 pages.
Jedamzik, "ZERODUR Tailored for Cryogenic Application", Proc. of SPIE vol. 9151, Jul. 18, 2014, pp. 91512P-1 to 91512P-10.
Burge, "Thermal Expansion of Borosilicate Glass, Zerodur, Zerodur M, and Unceramized Zerodur at Low Temperatures", Applied Optics, vol. 38, No. 34, Dec. 1, 1999, pp. 7161-7162.
Collocott et al., "Heat Capacity and Thermal Expansion of Zerodur and Zerodur M at Low Temperatures", Cryogenics, Elsevier, Kidlington, GB, vol. 31, No. 2, Feb. 1, 1991, pp. 102-104.
Hartmann, "Zero-Expansion Glass Ceramic ZERODUR—Recent Developments Reveal High Potential", Proceedings of SPIE—International Society for Optical Engineering, US, vol. 8450, Sep. 13, 2012, pp. 845022-1 to 845022-13.
Dohring, "Manufacturing of Lightweighted ZERODUR Components at Schott", SPIE, vol. 6666, 2007, pp. 666602-1-666602-9.
Jedamzik, "Homogeity of the Linear Thermal Expansion Coefficient of ZERODUR Measured with Improved Accuracy", Proceedings of SPIE, vol. 6273, Jun. 14, 2006, pp. 627306-1 to 627306-12.

* cited by examiner

*Primary Examiner* — Joanna Pleszczynska
(74) *Attorney, Agent, or Firm* — Ohlandt, Greeley, Ruggiero & Perle, L.L.P.

(57) ABSTRACT

The present disclosure relates to a component for low-temperature applications, a process for producing such a component, and the use thereof.

9 Claims, 4 Drawing Sheets

COMPONENT FOR LOW-TEMPERATURE APPLICATIONS

CROSS REFERENCE TO RELATED APPLICATIONS

This application claims priority under 35 U.S.C. § 119 of German Patent Applications DE102013225281 filed Dec. 9, 2013, and DE102014212062 filed Jun. 24, 2014, the entire contents of which are incorporated herein by reference.

BACKGROUND OF THE DISCLOSURE

1. Field of the Disclosure

The present disclosure relates to a component for low-temperature applications, a process for producing such a component and the use thereof.

2. Description of Related Art

Transparent glass-ceramics having a low coefficient of thermal expansion are known in the prior art and are described, for example, in DE1902432C, U.S. Pat. No. 4,851,372A and U.S. Pat. No. 5,591,682A. Among glass-ceramics having a particularly low thermal expansion, lithium aluminosilicate (LAS) glass-ceramics are known as "zero expansion materials".

For example, ZERODUR® is supplied in five thermal expansion classes defined by a certain range of CTE (0° C.; 50° C.):

| | | |
|---|---|---|
| ZERODUR® expansion class 2 | 0 ± 100 × ppb/K | (0 ± 0.100 × 10⁻⁶/K) |
| ZERODUR® expansion class 1 | 0 ± 50 × ppb/K | (0 ± 0.050 × 10⁻⁶/K) |
| ZERODUR® expansion class 0 | 0 ± 20 × ppb/K | (0 ± 0.020 × 10⁻⁶/K) |
| ZERODUR® expansion class 0 SPECIAL | 0 ± 10 × ppb/K | (0 ± 0.010 × 10⁻⁶/K) |
| ZERODUR® expansion class 0 EXTREME | 0 ± 7 × ppb/K | (0 ± 0.007 × 10⁻⁶/K) |

Glass-ceramics are classified according to the average or mean coefficient of thermal expansion (CTE) ($T_0$; T), determined usually in the temperature range of from 0 to 50° C. However, a low value for CTE in the range of about room temperature (0° C.; 50° C.) is not necessarily associated with a low value for CTE at very low temperatures. Owing to the poorer expansion class at application temperatures close to absolute zero (−273.15° C.=0 Kelvin), ZERODUR® is therefore replaced in some applications by silicon carbide SiC whose CTE in this region is smaller than that of ZERODUR®.

Apart from the absolute value for the CTE of a material, the compatibility of the CTE, i.e. similar thermal expansion curves, with composites which are likewise used, for example carbon-fibre-reinforced plastics (CFRP) also plays a role for the application. Here, SiC has the disadvantage that although it has a thermal expansion curve similar to that of CFRP close to absolute zero, the thermal expansion curve of SiC at higher temperatures (>−120° C.) deviates significantly from the thermal expansion curve of CFRP. Thus, stresses occur in composite components composed of SiC and CFRP when the composite components are cooled, and these stresses can significantly reduce the durability of the composite components.

It was therefore an object of the present disclosure to solve the abovementioned problems. In particular, an improved zero expansion glass-ceramic for low-temperature applications should be provided. The CTE of such a component should be optimized in respect of the application temperature. Furthermore, a zero expansion glass-ceramic whose thermal expansion curve is compatible with (similar to) the thermal expansion curve of CFRP should be provided.

BRIEF SUMMARY OF THE DISCLOSURE

According to a first aspect of the disclosure, a component for low-temperature applications which comprises a glass-ceramic and has a thermal expansion in the range from 0° C. to −250° C. of at most 20 ppm, preferably at most 15 ppm, more preferably at most 10 ppm.

According to a second aspect of the disclosure, a component for low-temperature applications which has a CTE in the range from −250° C. to −225° C. of at most +/−0.6 ppm/K, preferably at most +/−0.5 ppm/K.

According to a third aspect of the disclosure, a component for low-temperature applications which has a CTE in the range from −50° C. to −180° C., preferably from −20° C. to −190° of less than +/−0.1 ppm/K, preferably a CTE of less than +/−0.05 ppm/K.

These and other aspects and objects, features and advantages of the present disclosure will become apparent upon a consideration of the following detailed description and the disclosure when read in conjunction with the Figures.

It is to be understood that both the foregoing general description and the following detailed description are merely exemplary of the disclosure, and are intended to provide an overview or framework for understanding the nature and character of the disclosure as claimed.

The entire disclosures of all applications, patents and publications, cited above and below are hereby incorporated by reference.

DETAILED DESCRIPTION OF THE DISCLOSURE

Figure 1:
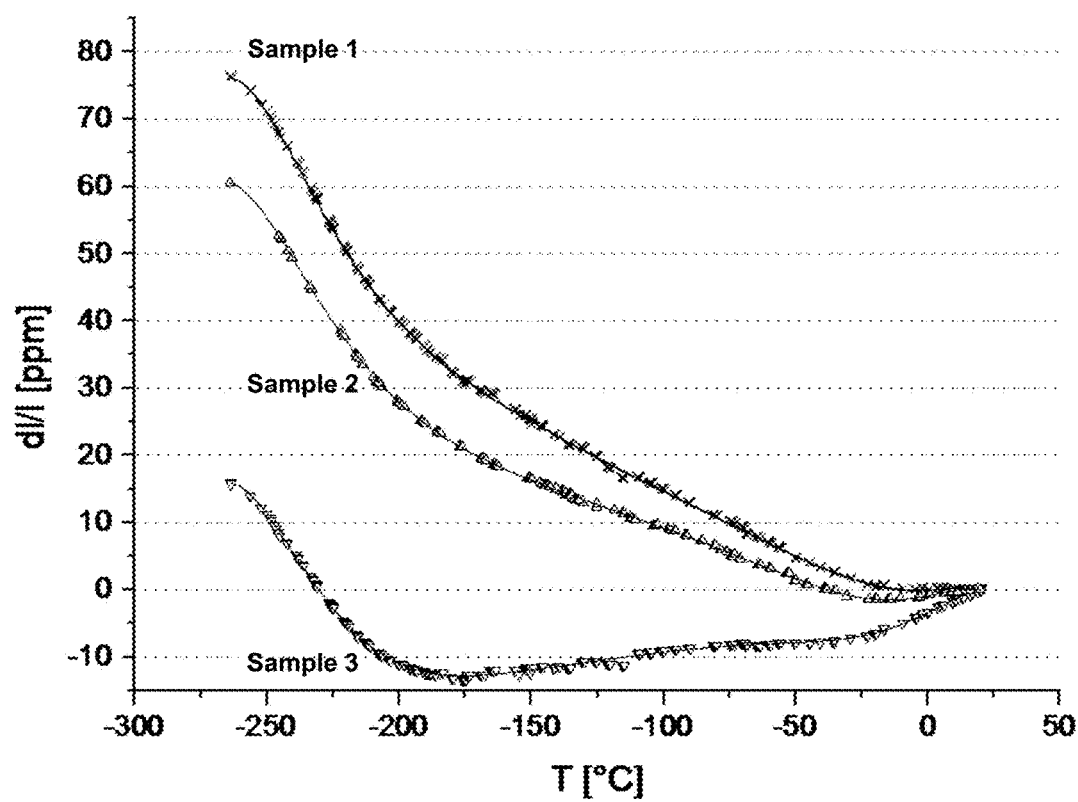
FIG. 1 shows the thermal expansion curves (dl/l-T curves or $\Delta l/l_0$-T curve) of two differently ceramicized ZERODUR® batches corresponding to Samples, 1 2 and 3.

The present disclosure relates to glass-ceramic components having a low coefficient of expansion or CTE ("coefficient of thermal expansion").

According to a first aspect of the present disclosure a component for low-temperature applications which comprises a glass-ceramic and has a thermal expansion in the range from 0° C. to −250° C. of at most 20 ppm, preferably at most 15 ppm, more preferably at most 10 ppm. Preferably, a component for low-temperature applications which comprises a glass-ceramic and has a thermal expansion in the range from 50° C. to −273° C. of at most 20 ppm, preferably at most 15 ppm, more preferably at most 10 ppm. The expression "having a thermal expansion of at most x ppm" means that within the temperature range specified, the length of a specimen deviates less than x ppm from the length measured at a starting temperature $t_0$.

According to a second aspect of the disclosure, a component for low-temperature applications which has a CTE in the range from −250° C. to −225° C. of at most +/−0.6 ppm/K, preferably at most +/−0.5 ppm/K.

According to a third aspect of the disclosure, a component for low-temperature applications which C has a CTE in the range from −50° C. to −180° C., preferably from −20° C. to −190° of less than +/−0.1 ppm/K, preferably a CTE of less than +/−0.05 ppm/K.

Regarding the before mentioned second and third aspect of the disclosure, a CTE of at most +/−0.6 ppb/K shall mean a CTE falling in the range from +0.6 ppb/K to −0.6 ppb/K and likewise for other numerical values.

Two or more of the abovementioned properties (i.e. CTE and thermal expansion) can also be present in combination in a component for low-temperature applications. e.g. according to a specific embodiment, the component has a thermal expansion in the range from 0° C. to −250° C. of at most 20 ppm and a CTE in the range from −250° C. to −225° C. of at most +/−0.6 ppm/K and a CTE in the range from −50° C. to −180° C. of less than +/−0.1 ppm/K. According to a very specific example a component having a thermal expansion in the range from 50° C. to −273° C. of at most 10 ppm and a CTE in the range from −250° C. to −225° C. of at most +/−0.5 ppm/K and a CTE in the range from 20° C. to −190° C. of less than +/−0.05 ppm/K is provided. Other combinations of the above mentioned ranges are also encompassed by the present disclosure.

The CTE for the temperature range from 0 to 50° C. (CTE (0; 50) or CTE (0° C.; 50° C.)) is usually reported. However, the CTE can also be specified for other temperature ranges. The CTE for a temperature range can be determined by means of equation (1) below:

$$CTE[t_0;t]=(1/l_0)\times(lt-l_0)/(t-t_0)=\Delta l/(l_0\times\Delta t) \quad (1)$$

where t0 is the initial temperature, t is the measurement temperature, l0 is the test specimen length at the initial temperature t0, lt is the test specimen length at the measurement temperature t and Δl is the corrected length change undergone by the test specimen at a temperature change Δt.

To determine a CTE, the length of a test specimen of a glass-ceramic is measured at the initial temperature $t_0$, the test specimen is heated to a second temperature t and the length $l_t$ at this temperature is measured. The CTE ($t_0$; t) for the temperature range $t_0$ to t is obtained from the abovementioned formula (1). The determination of the thermal expansion versus temperature can be carried out by means of dilatometry, i.e. determination of the length change of a test specimen as a function of the temperature. An instrument for determining the CTE is described, for example, in R. Mueller, K. Erb, R. Haug, A. Klaas, O. Lindig, G. Wetzig: "Ultraprecision Dilatometer System for Thermal Expansion Measurements on Low Expansion Glasses", 12$^{th}$ Thermal Expansion Symposium, Pittsburgh/PA, P. S. Gaal and D. E. Apostolescu Eds., 1997, the contents of which are incorporated in their entirety into the present patent application.

The CTE can also be reported not for a temperature range of [$t_0$; t] or ($t_0$; t) but also for a particular application temperature $T_A$. In this case, the CTE is determined as a function of temperature for this measurement method. The CTE(T) is then defined according to the formula (2) below:

$$CTE(T)=(1/l_0)\times(\partial l/\partial T) \quad (2)$$

Figure 3:
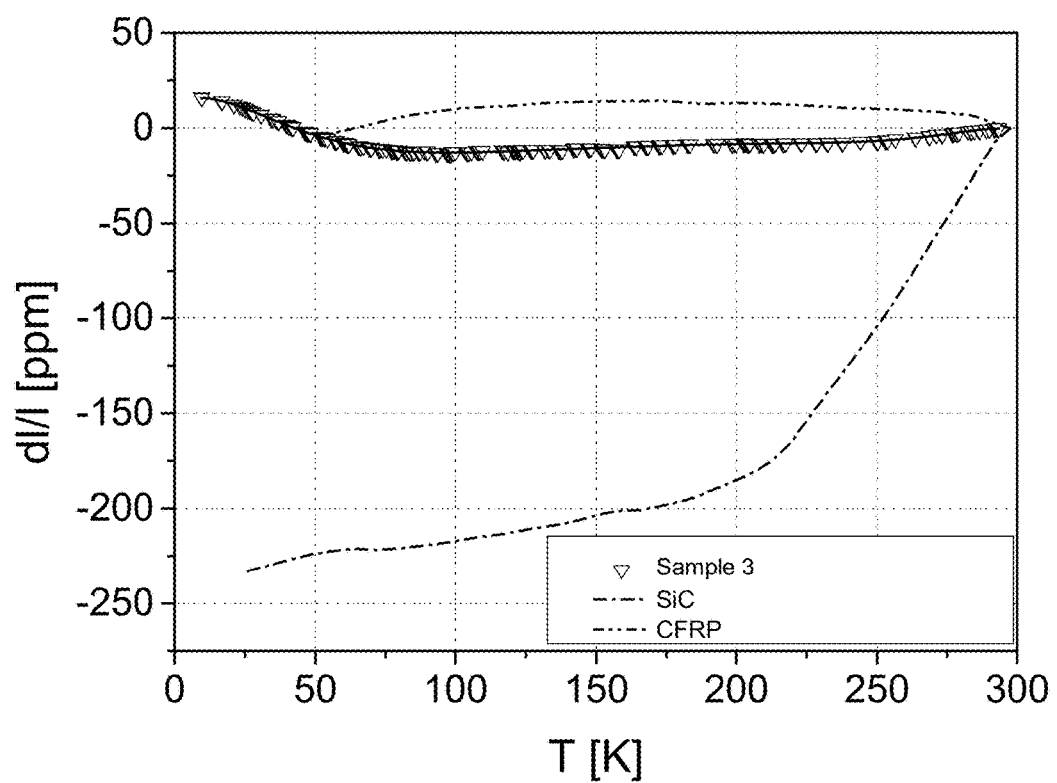
FIG. 3 shows a comparison of the thermal expansion curves of a ZERODUR® batch optimized for low temperature (sample 3 of the example) with the thermal expansion curves of SiC and CFRP. The CFRP shown is CFRP M55J/954-3 viz. a carbon-cyanate ester composite (provided by Hexel Corp.). The total length change of ZERODUR® from room temperature to 10 K is less than 50 ppm. The total length change of SiC, on the other hand, is about 230 ppm. Low-temperature-optimized ZERODUR® thus has a similar linear expansion at low temperatures to the CFRP.
Figure 4:
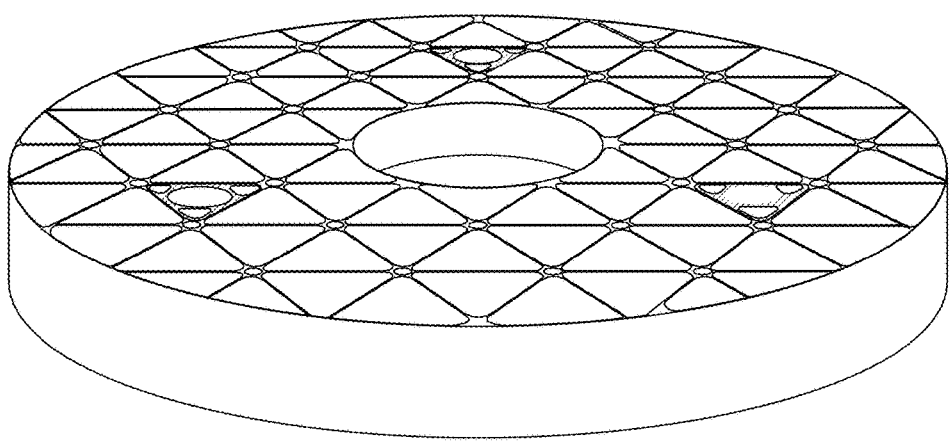
FIG. 4 shows a mirror support which due to lightweight machining weighs 88% less than the unmachined starting component.

To produce a thermal expansion curve $\Delta l/l_0$-T curve or a plot of the length change $\Delta l/l_0$ of a test specimen versus temperature, the temperature-dependent length change in the length of a test specimen from the initial length $l_0$ at the initial temperature $t_0$ to the length $l_t$ at the temperature t can be measured. Here, small temperature intervals of, for example, 5° C. or 3° C. are preferably used for determining a measurement point. Expansion curves are shown in FIGS. 1 and 3.

Such measurements can, for example, be carried out by dilatometric methods, interferometric methods, for example the method of Fabry-Perot, i.e. evaluation of the shift in the resonance peak of a laser beam injected into the material, or other suitable methods.

The selected method for determining the $\Delta l/l_0$-T measurement points preferably has a precision of preferably at least ±0.10 ppm, more preferably ±0.05 ppm, most preferably ±0.01 ppm.

Furthermore, a glass-ceramic is usually also defined by the possible deviations from the CTE average which make it still usable for the planned application. This deviation from the CTE is reported as a range ("0±x10$^{-6}$/K" or "0±x ppb/K"). An "average CTE" is the average of all CTE measurements carried out on a glass-ceramic component at various places or on various specimen cut from one block. For the purposes of the disclosure, a "low average CTE" is a value of at most 0±20 ppb/K, more preferably at most 0±10 ppb/K, most preferably at most 0±7 ppb/K.

The homogeneity of the CTE over the entire component is preferably at most 10 ppb/K. The value of the CTE homogeneity ("total spatial variation of CTE") is the peak-to-valley value, i.e. the difference between the respective greatest and the respective lowest CTE value of samples taken from a glass-ceramic. For the purposes of the disclosure, the value is reported in ppb/K, where 1 ppb/K=0.001× 10$^{-6}$/K.

Components for precision applications should also have a good internal quality. The component preferably has at most 5 inclusions per 100 cm$^3$, more preferably at most 3 inclusions per 100 cm$^3$, most preferably at most 1 inclusion per 100 cm$^3$. For the purposes of the disclosure, inclusions include both bubbles and crystallites having a diameter of more than 0.3 mm.

For the purposes of the disclosure, a low-temperature application is a use of the component at temperatures close to absolute zero, for example in space. Furthermore, a low-temperature application can also be the use of the component at the temperature of liquid nitrogen, viz. about −196° C., in particular the temperature range from −273.15 to −150° C.

For the component according to the disclosure for low-temperature applications, preference is given to a glass-ceramic from the lithium aluminosilicate (LAS) system which comprises the following composition (in % by weight on an oxide basis):

| | |
|---|---|
| SiO$_2$ | 35-70 |
| Al$_2$O$_3$ | 17-35 |

| | |
|---|---|
| $Li_2O$ | 2-6 |
| $TiO_2$ | 0-6 |
| $ZrO_2$ | 0-6 |
| $TiO_2 + ZrO_2$ | 0.5-9 |
| ZnO | 0.5-5 |

The glass-ceramic can additionally contain one or more of the following components in the indicated ranges (in % by weight on an oxide basis):

| | |
|---|---|
| $B_2O_3$ | 0-6 |
| $Na_2O$ | 0-2 |
| $K_2O$ | 0-2 |
| MgO | 0-2 |
| $P_2O_5$ | 0-17 |
| CaO | 0-4 |
| BaO | 0-5 |
| SrO | 0-5 |

Specific examples of transparent glass-ceramics having low coefficients of expansion are described in DE1902432C, DE1596860, U.S. Pat. No. 4,851,372, and U.S. Pat. No. 5,591,682.

The component preferably comprises a glass-ceramic having the following composition (in % by weight on an oxide basis):

| | |
|---|---|
| $SiO_2$ | 50-70 |
| $Al_2O_3$ | 17-32 |
| $P_2O_5$ | 3-12 |
| $Li_2O$ | 2-5 |
| $Na_2O$ | 0-2 |
| $K_2O$ | 0-2 |
| MgO | 0-2 |
| CaO | 0-4 |
| BaO | 0-5 |
| SrO | 0-2 |
| ZnO | 0-4 |
| $TiO_2$ | 1-5 |
| $ZrO_2$ | 0-5 |

The glass-ceramic preferably has a proportion of $SiO_2$ of from 50 to 70% by weight. The proportion of $SiO_2$ is more preferably at most 62% by weight, even more preferably at most 60% by weight. The proportion of $SiO_2$ is more preferably at least 52% by weight, even more preferably at least 54% by weight.

The proportion of $Al_2O_3$ is preferably from 17 to 32% by weight. The glass-ceramic more preferably contains at least 20% by weight, even more preferably at least 22% by weight, of $Al_2O_3$. The proportion of $Al_2O_3$ is more preferably at most 30% by weight, more preferably at most 28% by weight.

The phosphate content $P_2O_5$ of the glass-ceramic is preferably from 3 to 12% by weight. The glass-ceramic more preferably contains at least 4% by weight, even more preferably at least 5% by weight, of $P_2O_5$. The proportion of $P_2O_5$ is preferably limited to at most 10% by weight, more preferably at most 8% by weight.

The glass-ceramic preferably also contains $TiO_2$ in a proportion of from 1 to 5% by weight, with preference being given to at least 1.5% by weight of $TiO_2$ being present. However, the proportion is preferably limited to at most 4% by weight, more preferably at most 3% by weight.

The glass-ceramic can also contain $ZrO_2$ in a proportion of at most 5% by weight, preferably at most 4% by weight. $ZrO_2$ is preferably present in a proportion of at least 0.5% by weight, more preferably at least 1% by weight.

Furthermore, the glass-ceramic can contain alkali metal oxides such as $Li_2O$, $Na_2O$ and $K_2O$. $Li_2O$ is preferably present in a proportion of at least 2% by weight, preferably at least 3% by weight. The proportion of $Li_2O$ is limited to preferably at most 5% by weight, more preferably at most 4% by weight. $Na_2O$ and $K_2O$ are optionally present in the glass-ceramic. The proportion of $Na_2O$ and/or $K_2O$ can in each case and independently be at most 2% by weight, preferably at most 1% by weight, most preferably at most 0.5% by weight. $Na_2O$ and $K_2O$ can in each case and independently be present in a proportion of at least 0.01% by weight, preferably at least 0.02% by weight, more preferably at least 0.05% by weight, in the glass-ceramic.

The glass-ceramic can also contain alkaline earth metal oxides such as MgO, CaO, BaO and/or SrO, and also further divalent metals such as ZnO. The proportion of CaO is preferably at most 4% by weight, more preferably at most 3% by weight, even more preferably at most 2% by weight. The glass-ceramic preferably contains at least 0.1% by weight, more preferably at least 0.5% by weight, of CaO. MgO can be present in the glass-ceramic in a proportion of at most 2% by weight, preferably at most 1.5% by weight, and/or preferably at least 0.1% by weight. The glass-ceramics can contain BaO in a proportion of less than 5% by weight, preferably at most 4% by weight, and/or preferably at least 0.1% by weight. In individual embodiments, the glass-ceramics are BaO-free. The glass-ceramics can contain SrO in a proportion of at most 2% by weight and/or preferably at least 0.1% by weight. In individual embodiments, the glass-ceramics are SrO-free. As further metal oxide, the glass-ceramic preferably contains ZnO in a proportion of preferably at least 1% by weight, more preferably at least 1.5% by weight. The proportion of ZnO is limited to at most 4% by weight, preferably at most 3% by weight.

The glass-ceramic can also contain one or more customary refining agents such as $As_2O_3$, $Sb_2O_3$, SnO, $SO_4^{2-}$, $F^-$, $Cl^-$, Br or a mixture of these in a proportion of at most 1% by weight.

One embodiment of the disclosure relates to glass-ceramic components having a large volume. For the purposes of the present patent application, this term refers to a glass-ceramic component having a mass of at least 500 kg, preferably at least 1 tonne (whereas 1 tonne=1 metric ton=1000 kg), more preferably at least 2 tonnes, in one variant of the disclosure at least 5 tonnes, or edge lengths (width and/or depth) in the case of rectangular shapes of at least 0.5 m, more preferably at least 1 m, and a thickness (height) of at least 50 mm, preferably 100 mm, or in the case of round shapes a diameter of at least 0.5 m, more preferably at least 1 m, more preferably at least 1.5 m, and/or a thickness (height) of at least 50 mm, preferably 100 mm. In specific embodiments of the disclosure, the glass-ceramic components can be even larger glass-ceramic components having, for example, a diameter of at least 3 m or at least 4 m or greater.

The component of the disclosure can also have a lightweight structure. This means that hollow spaces for reducing the weight are provided in some regions of the component. The weight of a component is preferably reduced by lightweight machining to an extent of at least 50%, more preferably at least 70%, in particular embodiments even from 80 to 90%, compared to the unmachined component.

Particularly when a lightweight structure is present, it can be advantageous for the surface of the component to be at least partly etched or for at least part of the surface to be etched, i.e. a surface layer of the component has been removed by chemical reaction with an etching solution at this place/these places. Etching of the surface increases the strength, in particular the fracture strength, of the component.

To etch a glass-ceramic component, this is, after the grinding process, dipped into an etching bath. As etching bath, it is possible to use, for example, a mixture of hydrofluoric acid HF (38%) with hydrochloric acid HCl (37%) and water in a ratio of 2:1:1.5. The component is preferably left in the etching bath until material has been removed from the surface in a layer thickness of at least 50 µm, preferably at least 60 µm, or at most 120 µm, preferably at most 100 µm.

Furthermore, the component can comprise at least one CFRP in addition to the glass-ceramic. Preference is given to using thermosets, for example epoxy resins or cyanate ester resins as polymer matrix for the carbon-fibre-reinforced plastic.

The present disclosure further provides a process for producing the component of the disclosure for low-temperature applications, which comprises the step Setting of the dl/l-T curve of the glass-ceramic.

The process according to the present disclosure also may comprise the step of adapting the ceramization time according to the data received by analysing the dl/l-T curve. According to a specific embodiment, the process may comprise the step of holding the green glass or preceramized glass ceramic at a temperature of between 770 to 800° C. for a holding time of at least 100 hours, preferable at least 200 hours and according to specific embodiments of the disclosure even at least 500 hours. This holding time preferably is limited to at most 2000 hours, preferably to at most 1500 hours. The holding time may be either be reached during a single ceramizing step or may be divided into two or even three ceramizing steps.

The process of the disclosure makes it possible to match the thermal expansion properties of the components according to the disclosure to other materials, for example CFRP, which are to be joined to the glass-ceramic component to give a composite component. The setting of the dl/l-T curve can, for example, be effected by the method described in EP1321440A2 which is incorporated herein via reference.

The present disclosure also provides for the use of the component of the disclosure at an application temperature in the range from −273.15 to −150° C. The CTE of the glass-ceramic component is preferably optimized for the application temperature, i.e. has the lowest thermal expansion in the case of small temperature changes around the application temperature.

In particular, the component of the disclosure can be used in satellite technology, as substrate for space telescopes or in measurement technology.

The present disclosure also provides a mirror substrate and a reflectively coated mirror for astronomy, preferably for use in space. Furthermore, this is preferably a mirror substrate or a mirror which comprises a lightweight structure.

It goes without saying that the abovementioned features of the disclosure and the features still to be explained below can be used not only in the combination indicated in each case but also in other combinations without going outside the scope of the disclosure. The disclosure is illustrated by the following examples, but is not restricted to these.

EXAMPLES

A composition made up of the starting compounds specified in Table 1 (% by weight on an oxide basis) was melted in a melting tank over a period of several days and subsequently poured into moulds having an edge length of 1.3 m and a height of 350 mm.

TABLE 1

| Component | % by weight (on an oxide basis) |
|---|---|
| $SiO_2$ | 56.1 |
| $Al_2O_3$ | 25.5 |
| $P_2O_5$ | 7.1 |
| $Li_2O$ | 3.5 |
| $Na_2O$ | 0.2 |
| $K_2O$ | 0.5 |
| $MgO$ | 1.0 |
| $ZnO$ | 1.5 |
| $TiO_2$ | 2.2 |
| $ZrO_2$ | 1.9 |
| $As_2O_3$ | 0.5 |
| Total | 100.0 |

Blocks of the green glass produced in this way were ceramicized after removal of the outer regions under the following conditions: the green bodies were heated to a temperature of between 630 and 660° C. with a heating rate of 0.5° C./h. The heating rate was then reduced to 0.01° C./h and heating was continued up to a Temperature of between 770 and 800° C. and hold at this temperature for the holding time as specified in Table 2. The ceramized block was cooled down to room temperature with a cooling rate of −1° C./h.

Out of this ceramized block, three samples were cut and two of these underwent a post ceramization step.

TABLE 2

| | Holding time | Further ceramizing time | CTE (0; 50) |
|---|---|---|---|
| Sample 1 | 30 h | none | −0.051 ppm/K |
| Sample 2 | 80 h | none | −0.012 ppm/K |
| Sample 3 | 80 h | 700 h | +0.1 ppm/K |

FIG. 1 shows the thermal expansion curves of Samples 1 to 3 from near absolute zero to 25° C. The thermal expansion of Sample 3 is less than +/−20 ppm over a wide temperature range (room temperature to −270° C.) and is therefore significantly improved compared to Samples 1 and 2. In the range from room temperature to −280° C., the thermal expansion is even in the region of less than +/−10 ppm which means that the length of the sample deviates less than 10 ppm from the length measured at the starting temperature $t_0$ of the measurement.

Figure 2:
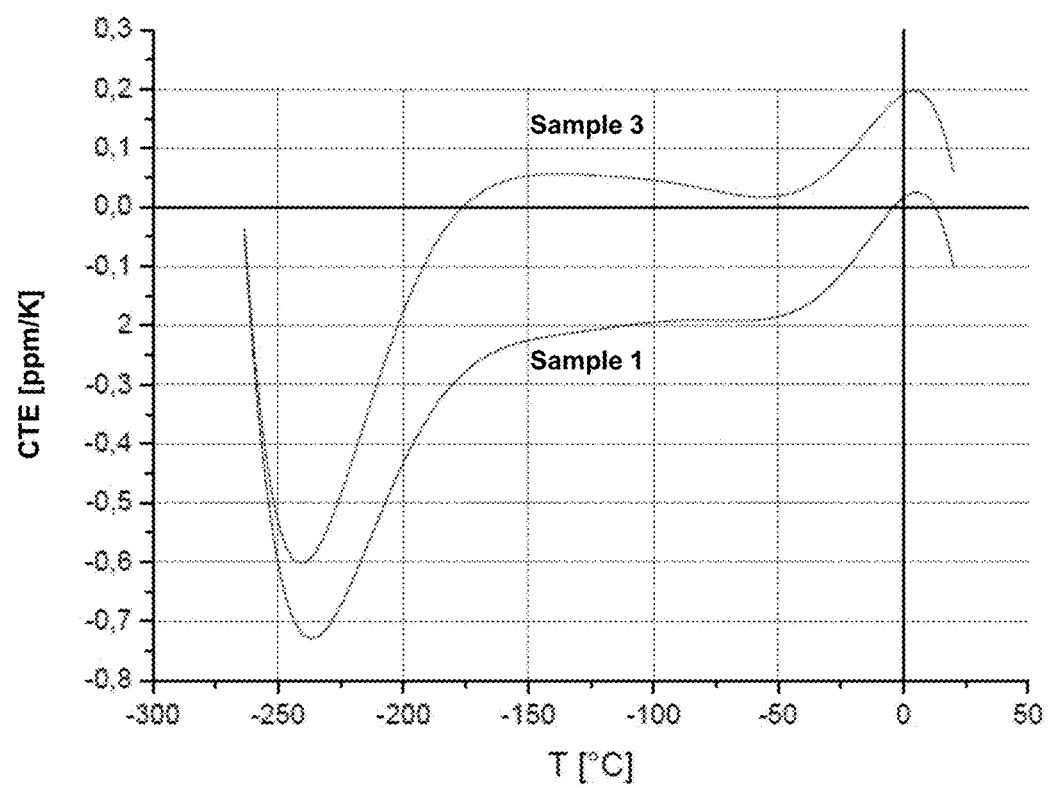
FIG. 2 shows the change in the coefficient of thermal expansion CTE of two differently ceramicized ZERODUR® batches corresponding to Sample 1 and Sample 3.

Measurements of the thermal expansion of ZERODUR® down to 10 K were carried out on Sample 1 and Sample 3. The measurements were carried out as described in R. Schodel, A. Walkov, M. Zenker, G. Bartl, R. Meeß, D. Hagedorn, C. Gaiser, G. Thummes and S. Heltzel. A new Ultra Precision Interferometer for absolute length measurements down to cryogenic temperatures. Meas. Sci. Technol. 23 (2012) which is incorporated herein by reference. The results are shown in FIGS. 1 and 2. FIG. 2 shows that Sample 3 having a clearly positive CTE(0; 50) at room temperature of about +0.1 ppm/K has a lower expansion at low temperatures than Sample 1 which has a lower CTE(0; 50) at room temperature.

The preceding examples can be repeated with similar success by substituting the generically or specifically described reactants and/or operating conditions of this disclosure for those used in the preceding examples.

From the foregoing description, one skilled in the art can easily ascertain the essential characteristics of this disclosure and, without departing from the spirit and scope thereof, can make various changes and modifications of the disclosure to adapt it to various usages and conditions.

The invention claimed is:

1. A component for low-temperature applications, the component comprising:
a lithium aluminosilicate glass-ceramic having the following composition in % by weight on an oxide basis:

| | |
|---|---|
| SiO$_2$ | 35-70 |
| Al$_2$O$_3$ | 17-35 |
| Li$_2$O | 2-6 |
| TiO$_2$ | 0-6 |
| ZrO$_2$ | 0-6 |
| TiO$_2$ + ZrO$_2$ | 0.5-9 |
| ZnO | 0.5-5, | wherein the glass-ceramic has at most 5 inclusions per 100 cm$^3$,
wherein the glass-ceramic has a surface that is at least partly etched so that a layer thickness of at least 50 µm and at most 120 µm has been removed from the surface, and
wherein the glass-ceramic has a thermal expansion in a range from:
0° C. to −250° C. of at most 20 ppm,
−250° C. to −225° C. of at most +/−0.6 ppm/K, and
−50° C. to −180° C. of less than +/−0.1 ppm/K.

2. The component according to claim 1, wherein the glass-ceramic has a coefficient of thermal expansion homogeneity over an entirety of the glass-ceramic that is 10 ppb/K peak-to-valley.

3. The component according to claim 1, further comprising:
a carbon-fibre-reinforced plastic.

4. The component of claim 1, wherein the glass-ceramic is the component.

5. The component of claim 1, wherein the inclusions are bubbles or crystallites having a diameter of more than 0.3 mm.

6. A component comprising:
a mirror substrate having a lithium aluminosilicate glass-ceramic of the following composition in % by weight on an oxide basis:

| | |
|---|---|
| SiO$_2$ | 35-70 |
| Al$_2$O$_3$ | 17-35 |
| Li$_2$O | 2-6 |
| TiO$_2$ | 0-6 |
| ZrO$_2$ | 0-6 |
| TiO$_2$ + ZrO$_2$ | 0.5-9 |
| ZnO | 0.5-5, | wherein the glass-ceramic has a surface that is at least partly etched and a layer thickness of at least 50 µm and at most 120 µm has been removed from the surface, and
wherein the glass-ceramic has at most 5 inclusions per 100 cm$^3$ and at least one property selected from the group consisting of: a thermal expansion in a range from 0° C. to −250° C. of at most 20 ppm, a coefficient of thermal expansion in a range from −250° C. to −225° C. of at most +/−0.6 ppm/K, and a coefficient of thermal expansion in a range from −50° C. to −180° C. of less than +/−0.1 ppm/K.

7. The component of claim 6, wherein the inclusions are bubbles or crystallites having a diameter of more than 0.3 mm.

8. A component comprising:
a reflectively coated mirror having a lithium aluminosilicate glass-ceramic with the following composition in % by weight on an oxide basis:

| | |
|---|---|
| SiO$_2$ | 35-70 |
| Al$_2$O$_3$ | 17-35 |
| Li$_2$O | 2-6 |
| TiO$_2$ | 0-6 |
| ZrO$_2$ | 0-6 |
| TiO$_2$ + ZrO$_2$ | 0.5-9 |
| ZnO | 0.5-5, | wherein the glass-ceramic has a surface that is at least partly etched so that a layer thickness of at least 50 µm and at most 120 µm has been removed from the surface, and
wherein the glass-ceramic has at most 5 inclusions per 100 cm$^3$ and at least one property selected from the group consisting of: a thermal expansion in a range from 0° C. to −250° C. of at most 20 ppm, a coefficient of thermal expansion in a range from −250° C. to −225° C. of at most +/−0.6 ppm/K, and a coefficient of thermal expansion in a range from −50° C. to −180° C. of less than +/−0.1 ppm/K.

9. The component of claim 8, wherein the inclusions are bubbles or crystallites having a diameter of more than 0.3 mm.

* * * * *